United States Patent
Jung

(10) Patent No.: US 8,780,187 B2
(45) Date of Patent: Jul. 15, 2014

(54) DISPLAY APPARATUS AND DRIVING METHOD FOR REDUCING AFTERIMAGE

(75) Inventor: Jae-woong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 12/869,946

(22) Filed: Aug. 27, 2010

(65) Prior Publication Data

US 2011/0058018 A1  Mar. 10, 2011

(30) Foreign Application Priority Data

Sep. 8, 2009 (KR) .......................... 10-2009-0084347

(51) Int. Cl.
H04N 13/04 (2006.01)
G09G 3/294 (2013.01)
G09G 3/20 (2006.01)

(52) U.S. Cl.
CPC .......... H04N 13/0438 (2013.01); H04N 13/04 (2013.01); G09G 3/294 (2013.01); G09G 3/2944 (2013.01); G09G 3/2037 (2013.01); G09G 3/204 (2013.01); G09G 2320/0257 (2013.01); G09G 2320/0266 (2013.01); H04N 13/0497 (2013.01)
USPC ................. 348/56; 348/43; 348/51; 348/55; 349/13; 349/15

(58) Field of Classification Search
CPC ..... G09G 3/003; G09G 3/294; G09G 3/2037; G09G 3/204; G09G 2320/0257; G09G 3/2022; G09G 3/28; H04N 5/66
USPC ............... 348/43, 56, 797, 47, 48, 51, 55–57; 345/6, 8, 60, 204, 419, 690, 691; 349/13, 15

See application file for complete search history.

(56) References Cited

U.S. PATENT DOCUMENTS

| | | | |
|---|---|---|---|
| 6,687,399 B1 | 2/2004 | Chuang et al. | |
| 6,977,629 B2 * | 12/2005 | Weitbruch et al. | 345/6 |
| 7,773,161 B2 * | 8/2010 | Correa et al. | 348/797 |
| 2004/0125050 A1 * | 7/2004 | Ohira et al. | 345/60 |
| 2005/0001789 A1 * | 1/2005 | Choi | 345/8 |
| 2009/0085841 A1 * | 4/2009 | Choi et al. | 345/68 |
| 2009/0284446 A1 * | 11/2009 | Origuchi et al. | 345/60 |
| 2010/0007666 A1 * | 1/2010 | Nohara et al. | 345/501 |

FOREIGN PATENT DOCUMENTS

EP  1187089 A2 *  3/2002
KR  20-0366330 Y1  11/2004

* cited by examiner

*Primary Examiner* — Sath V Perungavoor
*Assistant Examiner* — Nathnael Aynalem
(74) *Attorney, Agent, or Firm* — Sughrue Mion, PLLC

(57) ABSTRACT

A display apparatus for reducing an afterimage and a driving method thereof are provided. The display apparatus includes a video processor which divides and outputs each of frames constituting the left-eye image and the right-eye image into a plurality of sub-frames which have different sustaining times when the left-eye image and the right-eye image are input; a display unit which displays an image based on the divided sub-frames; and a controller which prevents recognition of at least one sub-frame among the plurality of sub-frames on the basis of the sustaining times of the plurality of sub-frames, thus presenting a clear image.

19 Claims, 5 Drawing Sheets

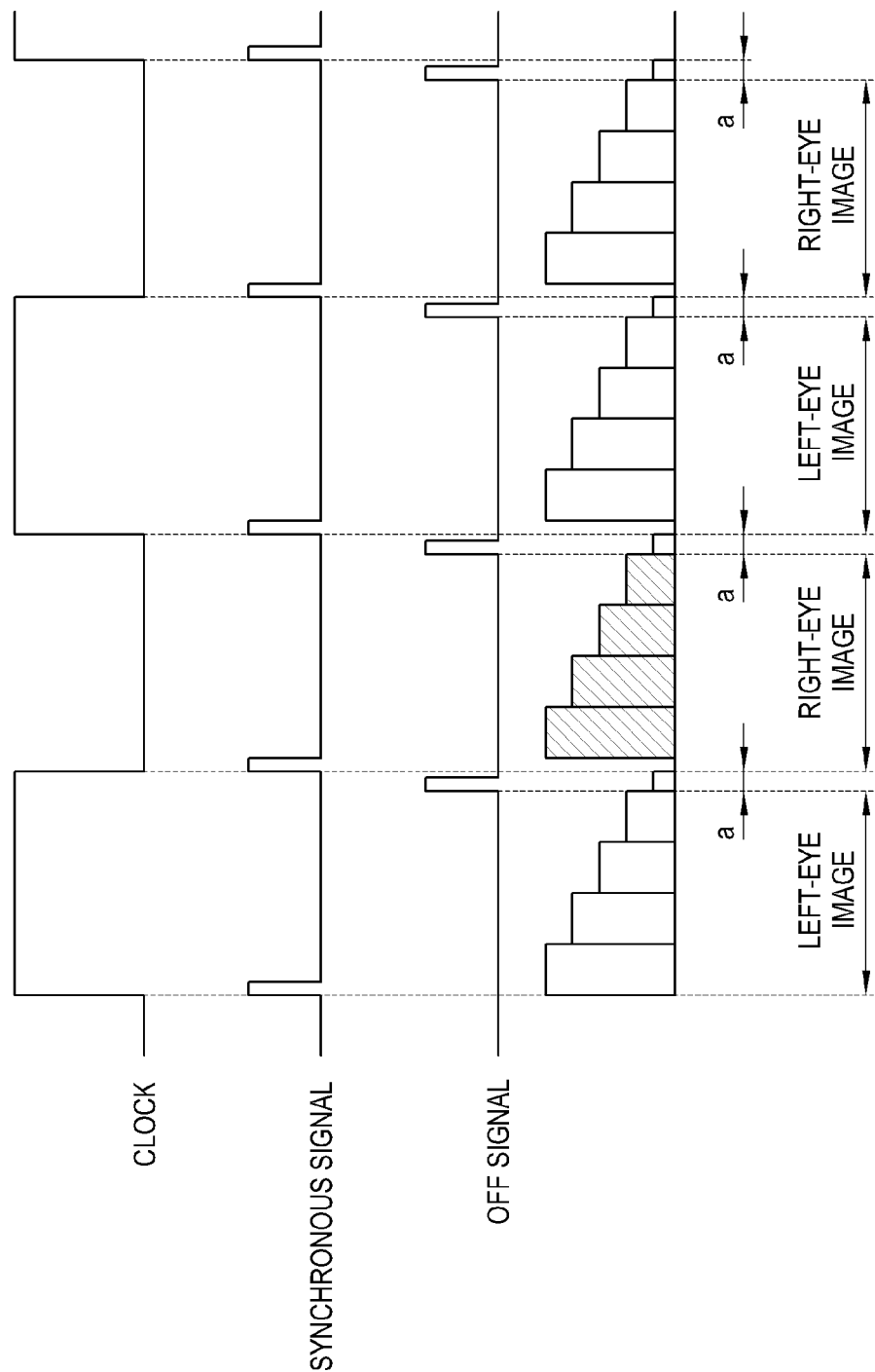

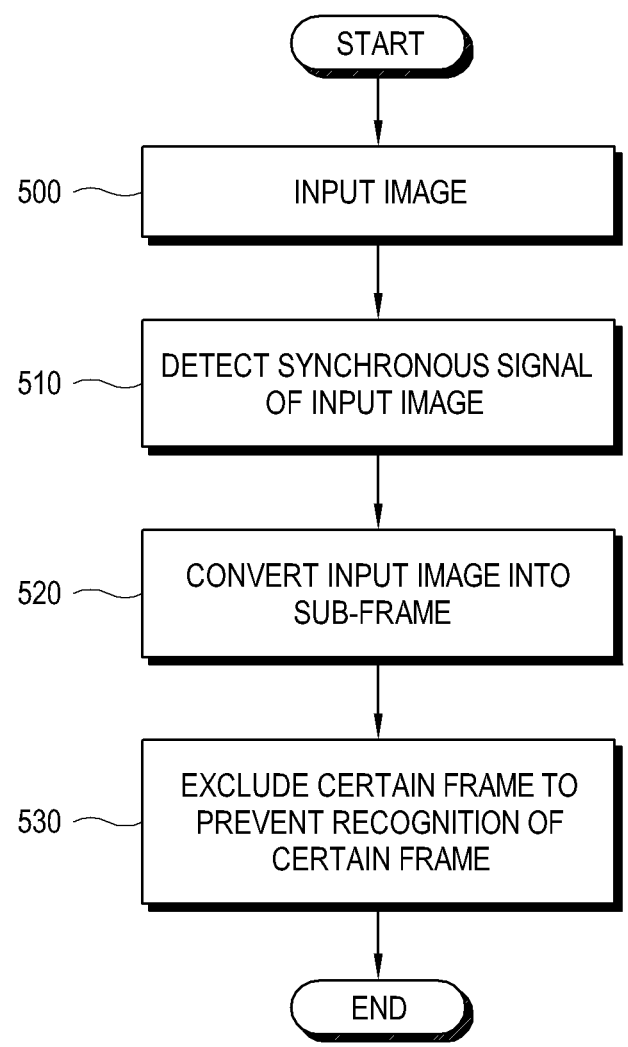

DISPLAY APPARATUS AND DRIVING METHOD FOR REDUCING AFTERIMAGE

CROSS-REFERENCE TO RELATED APPLICATION

This application claims priority from Korean Patent Application No. 10-2009-0084347, filed on Sep. 8, 2009 in the Korean Intellectual Property Office, the disclosure of which is incorporated herein by reference.

BACKGROUND

1. Field

Apparatuses and methods consistent with the exemplary embodiments relate to a display apparatus for reducing an afterimage and a driving method thereof, and more particularly to a display apparatus for reducing an afterimage in a stereoscopic image to present a clear image and a driving method thereof.

2. Description of the Related Art

The world seen through human eyes is in three dimensions. That is, an object has length, breadth and height. In the case of one dimension or two dimensions, there is no difference, when viewing an image, if the image is viewed with one eye or with two eyes. However, there is much difference in the case of three dimensions. Accordingly, technology for representing three-dimensional (3D) images has been tested, and a method of displaying a 3D image has been researched and commercialized in many fields such as photography, movies, television, television games, etc. Technology for a 3D stereoscopic image is generally based on binocular parallax that has the largest effect on giving a stereoscopic view at a short distance. Here, the stereoscopic image can be seen through liquid crystal shutter-type 3D glasses, in which the left-eye image and the right-eye image are quickly alternated on a screen, and the shutter-type 3D glasses are opened and closed in sync with the left-eye image and the right-eye image to thereby achieve the 3D image. Specifically, the 3D glasses have an opened left-shutter and a closed right-shutter while the screen shows the left-eye image, but have the closed left-shutter and the opened right-shutter while the screen shows displays the right-eye image. At this time, if the left-eye image remains as an afterimage, the left-eye image may be seen for a while as the afterimage while the right-eye image is displayed. On the other hand, if the right-eye image remains as an afterimage, the right-eye image may be seen for a while as the afterimage while the left-eye image is displayed. Therefore, an image is not clearly seen.

SUMMARY

Accordingly, an aspect of the present exemplary embodiments is to provide a display apparatus for reducing an afterimage in a stereoscopic image and a driving method thereof, in which a separate signal for determining an off-time of the stereoscopic image is added to reduce the afterimage.

The foregoing and/or other aspects of the present exemplary embodiments can be achieved by providing a plasma display panel (PDP) display apparatus using glasses including a left-eye shutter and a right-eye shutter opened and closed alternately in synchronization with a left-eye image and a right-eye image of a stereoscopic image, the PDP display apparatus including: a video processor which divides and outputs each of frames constituting the left-eye image and the right-eye image into a plurality of sub-frames having different sustaining times when the left-eye image and the right-eye image are input; a display unit which displays an image based on the sub-frames divided by the video processor; and a controller which prevents recognition of at least one sub-frame among the plurality of sub-frames on the basis of the sustaining times of the plurality of sub-frames.

The controller may control the video processor to exclude at least one sub-frame on the basis of the sustaining time of the plurality of sub-frames.

The controller may control the left-eye shutter and the right-eye shutter of the glasses to be opened and closed so that recognition of at least one sub-frame can be prevented on the basis of the sustaining time of the plurality of sub-frames.

The controller may prevent the recognition of the sub-frame that has a short sustaining time among the plurality of sub-frames.

The controller may prevent the recognition of the sub-frame that has a short sustaining time among the plurality of sub-frames with respect to only one of the left-eye image and the right-eye image.

The controller may control the video processor to make the number of sub-frames in the left-eye image and the number of sub-frames in the right-eye image different from each other, and prevent the recognition of sub-frames in one of the left-eye image or the right-eye image according to a user's selection.

The controller may control the glasses to make the number of sub-frames in the left-eye image and the number of sub-frames in the right-eye image different from each other, and prevent the recognition of sub-frames in one of the left-eye image and the right-eye image according to a user's selection.

Another aspect of the present exemplary embodiments can be achieved by providing a method of driving a plasma display panel (PDP) display apparatus using glasses including a left-eye shutter and a right-eye shutter which open and close alternately in synchronization with a left-eye image and a right-eye image of a stereoscopic image, the method including: dividing each of frames constituting the input left- and right-eye images into a plurality of sub-frames different in a sustaining time; and preventing recognition of at least one sub-frame among the plurality of sub-frames on the basis of the sustaining times of the plurality of sub-frames.

The preventing the recognition of the at least one sub-frame may include excluding at least one sub-frame among the sub-frames.

The preventing the recognition of the at least one sub-frame may include controlling the left-eye shutter and the right-eye shutter of the glasses to be opened and closed so that the recognition of at least one sub-frame can be prevented.

The preventing the recognition of the at least one sub-frame may include preventing the recognition of the sub-frame with a short sustaining time among the plurality of sub-frames.

The preventing the recognition of the at least one sub-frame may include preventing the recognition of the sub-frame with a short sustaining time among the plurality of sub-frames with respect to only one of the left-eye image and the right-eye image.

The preventing the recognition of the at least one sub-frame may include making the number of sub-frames the left-eye image and the number of sub-frames of the right-eye image different from each other, and prevent the recognition of sub-frames in one of the left-eye image or the right-eye image according to a user's selection.

BRIEF DESCRIPTION OF THE DRAWINGS

The above and/or other aspects of the present exemplary embodiments will become apparent and more readily appreciated from the following description of the exemplary embodiments, taken in conjunction with the accompanying drawings, in which:

FIG. 4 is a view for explaining operation of the display apparatus according to another exemplary embodiment; and FIG. 5 is a flowchart showing the operation of the display apparatus according to an exemplary embodiment.

DETAILED DESCRIPTION OF EXEMPLARY EMBODIMENTS

Figure 1:
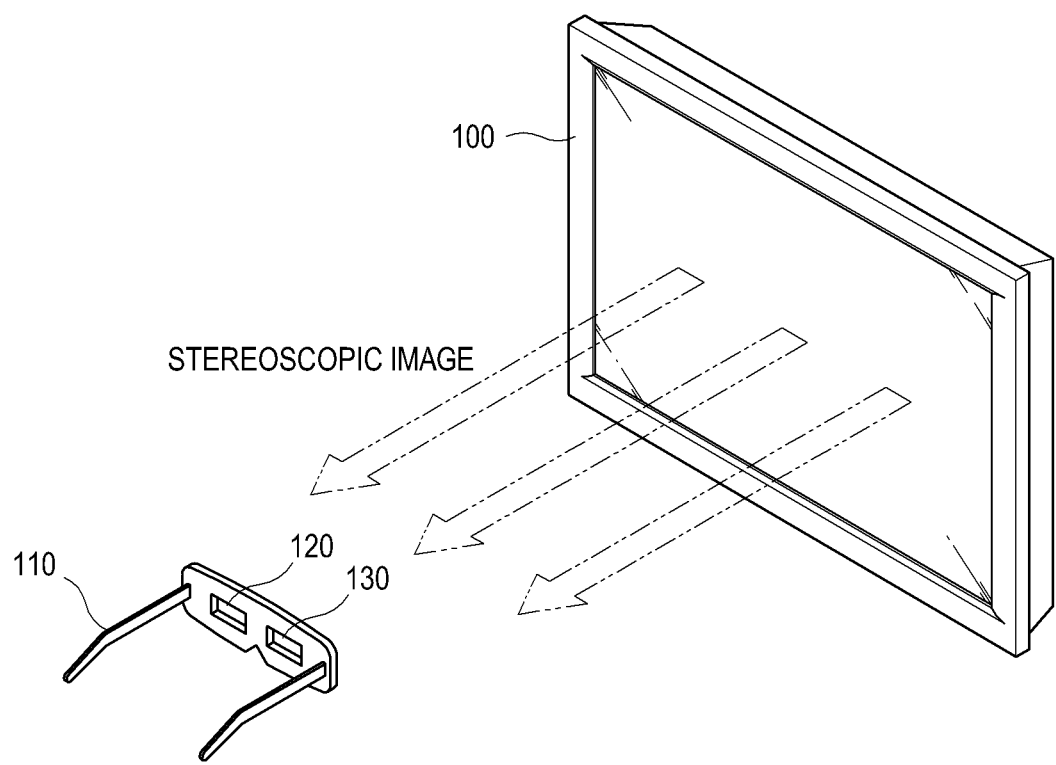
FIG. 1 is a view showing a display apparatus according to an exemplary embodiment of the present exemplary embodiments.

Below, exemplary embodiments will be described in detail with reference to accompanying drawings so as to be easily realized by a person having ordinary knowledge in the art. The exemplary embodiments may be embodied in various forms without being limited to the embodiments set forth herein. Descriptions of well-known parts are omitted for clarity, and like reference numerals refer to like elements throughout.

A plasma display panel (PDP) divides one frame image into a plurality of sub-frame images according to gradations in order to display the one frame image. A driving method for the PDP is divided into three steps that include a reset step for uniformly eliminating all wall charges of the whole cells, an addressing step for forming wall charges in the cells at certain positions, and a sustaining step for display. Correspondingly, a reset period, an addressing period and a sustaining period are allocated to each sub-frame image. Here, all the sub-frames have the same reset period and the same addressing period, but are different in the sustaining period according to bit weights of video data displayed during the addressing period. Below, a display apparatus employing the foregoing PDP will be described.

FIG. 1 is a view showing a display apparatus according to an exemplary embodiment of the, in which a left-eye image and a right-eye image are alternately displayed on a display unit 100, and a left-eye shutter 120 and a right-eye shutter 130 of glasses 110 are opened and closed in sync with the left-eye image and the right-eye image, thereby realizing a stereoscopic image. The display unit 100 and the glasses 110 are synchronized by an infrared signal. Here, the infrared signal may have a wavelength of about 8300 Å. Also, the infrared signal travels in a straight line and thus becomes weakened when meeting an obstacle. Further, the infrared signal has higher reflectivity than a radio wave having a low frequency.

Figure 2:
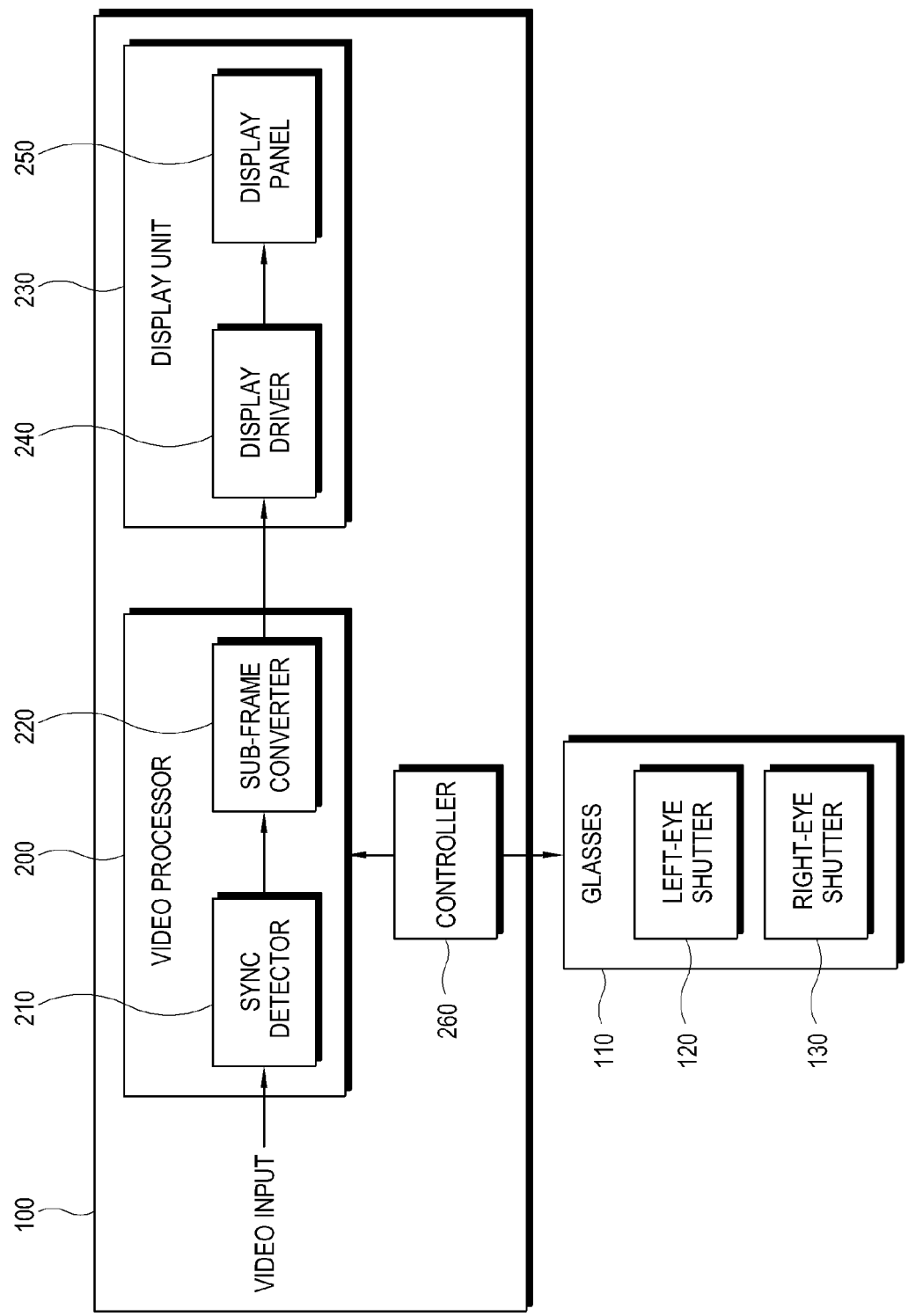
FIG. 2 is a view showing a configuration of the display apparatus according to an exemplary embodiment.

FIG. 2 is a view showing a configuration of the display apparatus according to an exemplary embodiment. As shown in FIG. 2, the display apparatus includes a video processor 200, a display unit 230, a controller 260, and glasses 110. The video processor 200 includes a sync detector 210 and a sub-frame converter 220. The display unit 230 includes a display driver 240 and a display panel 250. The sync detector 210 of the video processor 200 detects vertical and horizontal synchronous signals with respect to a stereoscopic image when the stereoscopic image containing the left-eye image and the right-eye image is input. The sub-frame converter 220 converts the stereoscopic image into a plurality of sub-frame images on the basis of the horizontal and vertical synchronous signals detected by the sync detector 210. That is, the respective frames constituting the input stereoscopic image are converted into a plurality of sub-frames. The display driver 240 receives the plurality of sub-frame images with regard to a stereoscopic image from the video processor 200 and displays the stereoscopic image on the display panel 250. The controller 260 controls the video processor 200 and the glasses 110 so that display timing of the left-eye image and the right-eye image alternately displayed on the display panel 250 can be controlled and the opening/closing timing of the left-eye shutter 120 and the right-eye shutter 130 of the glasses 1100 can be controlled. Here, the glasses 110 is driven by a shutter type, and includes the left-eye shutter 120 and the right-eye shutter 130.

Figure 3:
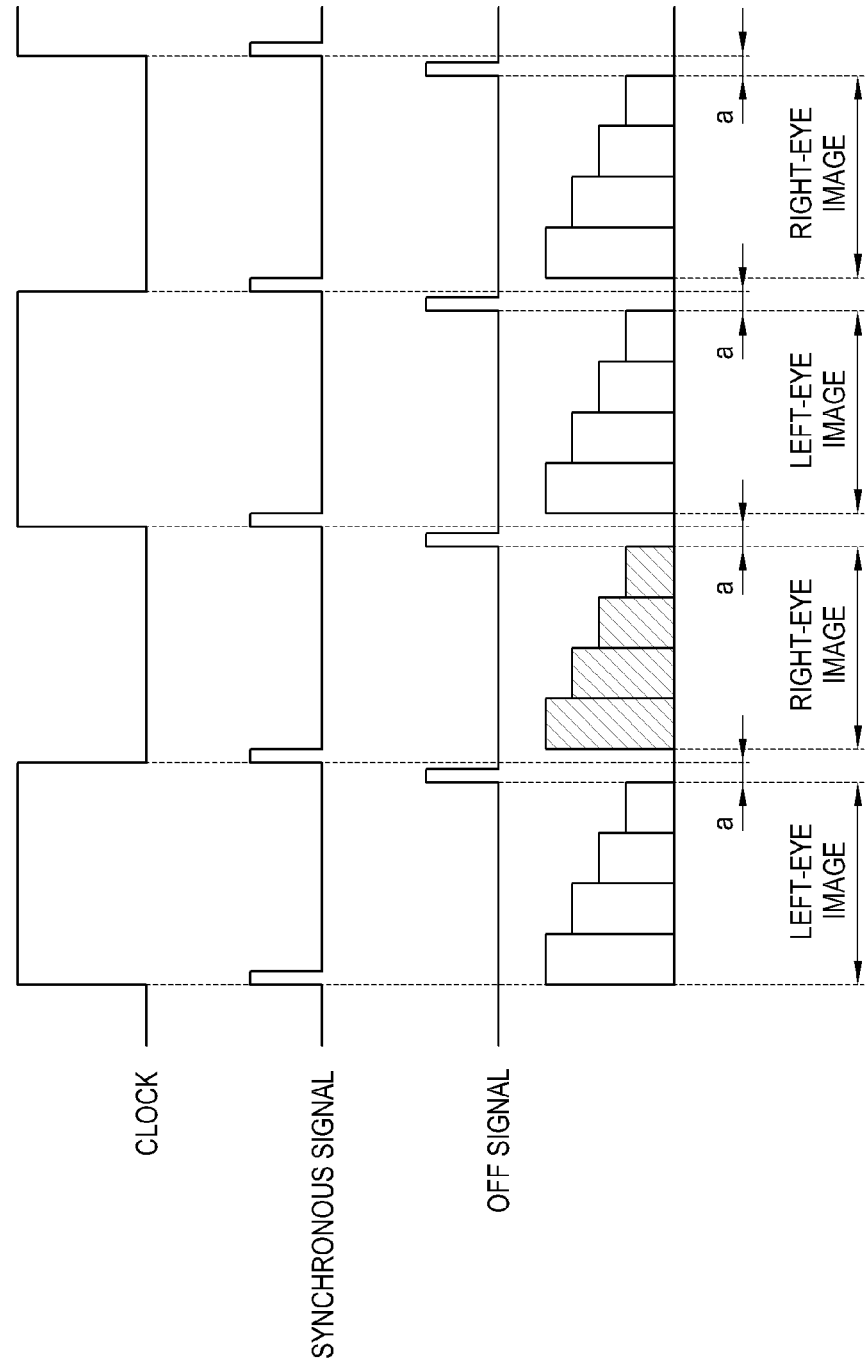
FIG. 3 is a view for explaining operation of the display apparatus according to an exemplary embodiment.

FIG. 3 is a view for explaining operation of the display apparatus according to an exemplary embodiment. If the sync detector 210 detects the synchronous signals with respect to the input stereoscopic image, the sub-frame converter 220 converts the respective frames constituting the stereoscopic image into the plurality of sub-frames on the basis of the synchronous signals. Then, if the plurality of sub-frames is provided to the display driver 240, the display driver 240 displays the respective sub-frames on the display panel 250, thereby displaying the stereoscopic image. At this time, the sustaining time of the respective sub-frames are different according to bit weights of video data, so that a sub-frame having a high weight can be displayed longer than a sub-frame having a low weight. For example, if each of the left-eye image and the right-eye image includes five sub-frames, the five sub-frames constituting the left-eye image are all displayed to form one left-eye image and the five sub-frames constituting the right-eye image are all displayed to form one right-eye image. The left-eye image and the right-eye image are displayed alternately every time the synchronous signal is generated. Here, the time for displaying one frame constituting the stereoscopic image is previously set. In the case of operation at 120[Hz], the plurality of sub-frames constituting one frame is displayed within $1/120$[s]. In this exemplary embodiment, an "off" signal as well as the synchronous signal is supplied as shown in FIG. 3. That is, the controller 260 supplies a signal to the video processor 200 to turn off the displayed stereoscopic image. If the "off" signal is generated, the displayed stereoscopic image disappears. Such an "off" signal may be supplied before the plural sub-frames constituting one frame are all displayed. For example, if each one frame of the left-eye image and the right-eye image includes five sub-frames, the five sub-frames are displayed according to bit weights of the video data, i.e., the sub-frame having the highest weight among the five sub-frames is displayed first, but the sub-frame having the lowest weight is displayed last. At this time, if the "off" signal is generated, the left-eye image disappears and the right-eye image is displayed in response to the synchronous signal. In this exemplary embodiment, the first to the fourth sub-frames constituting the left-eye image are displayed, and the "off" signal is generated at a moment when the fifth sub-frame is displayed, so that the fifth sub-frame 'a' is excluded from display. The excluded sub-frame is a frame having little effect on displaying the stereoscopic image, which also corresponds to a frame having a short sustaining time. Therefore, the "off" signal has to be generated at a point of time when the frame having the lowest bit weight of the video data is displayed among the sub-frames. In this manner, the left-eye image disappears before all sub-frames for the left-eye image are displayed, and the right-eye image is displayed in response to the synchronous signal, thereby reducing an afterimage due to the left-eye image. Likewise, an afterimage due to the right-eye image can be also reduced.

Meanwhile, the number of frames to be excluded may be changed according to a user's selection. If a user determines that a large effect of afterimages appears in his/her vision and thus he/she has to perform a screen adjustment, the controller controls a time for supplying the "off" signal according to a user's selection to thereby increase the number of frames to be excluded. Further, the left-eye image and the right-eye image are different in a time for generating the "off" signal, and may be thus controlled to be different in the number of frames to be excluded. Also, if an afterimage appears in only one of the left-eye image or the right-eye image, the "off" signal may be supplied with respect to the image where the afterimage appears.

As described above, the left-eye image and the right-eye image are displayed on the display panel 250. Below, there will be described the control of the glasses 110 to have the foregoing effect.

FIG. 4 is a view for explaining operation of the display apparatus according to another exemplary embodiment. The controller 260 controls the left-eye shutter 120 and the right-eye shutter 130 of the glasses 110 to be opened and closed in sync with the left-eye image and the right-eye image displayed on the display panel 250. For example, if the left-eye image is displayed, the left-eye shutter 120 of the glasses 110 is opened but the right-eye shutter 130 is closed. On the other hand, if the right-eye image is displayed, the right-eye shutter 130 of the glasses 110 is opened but the left-eye shutter 120 is closed. Such opening/closing operations for the left-eye shutter 120 and the right-eye shutter 130 of the glasses 110 are performed in response to the synchronous signals of the left-eye image and the right-eye image displayed on the display panel 250. In the meantime, if the glasses 110 are not opened even though the left-eye image and the right-eye image are displayed on the display panel 250, a user cannot see a displayed image. Thus, the controller 260 supplies the "off" signal to the glasses 110 while displaying the plurality of sub-frames, so that the opened shutter of the glasses 110 can be closed. Therefore, a user cannot see the displayed frame even if the frame is displayed. For example, in FIG. 4, if the plurality of frames constituting the left-eye image and the right-eye image each includes five sub-frames, one frame is formed by displaying all the five sub-frames. While the sub-frames are displayed corresponding to the left-eye image, the left-eye shutter 120 of the glasses 110 is being opened. At this time, if the "off" signal is generated, the opened left-eye shutter 120 of the glasses 110 is closed. In other words, the shutter is closed in response to the "off" signal even if all frames are not displayed. Referring to FIG. 4, the "off" signal is generated at a moment when the fifth sub-frame 'a' is displayed among the five sub-frames constituting the left-eye image, and therefore the left-eye shutter 120 of the glasses 110 is closed so that a user cannot see the fifth sub-frame 'a'. Accordingly, the fifth sub-frame 'a' constituting the left-eye image is not displayed on the display panel 250, and it would have the same effect of displaying the right-eye image. Likewise, if the "off" signal is generated while the right-eye image is displayed, the right-eye shutter 130 of the glasses 110 is closed so that a user cannot see the fifth frame 'a', thereby having the same effect as the fifth image constituting the right-eye image is not displayed. Here, a point of time to supply the "off" signal to the right-eye image is equal to that of the case where the display of the sub-frame is partially excluded. Also, the number of frames to be excluded may be varied depending on a user's selection.

FIG. 5 is a flowchart showing the operation of the display apparatus according to an exemplary embodiment. As shown in FIG. 5, when a stereoscopic image is input at operation 500, the synchronous signal of the input stereoscopic image is detected at operation 510. At operation 520, the stereoscopic image is converted into a plurality of sub-frames on the basis of the detected synchronous signal. Each sub-frame is displayed in response to the synchronous signal and forms the stereoscopic image. At this time, a certain frame having little effect on displaying the stereoscopic image is excluded at operation 530 to thereby prevent recognition of the certain frame. As a method of preventing the recognition of the certain frame, there may be considered a method of closing the glasses 110 at a moment when the certain frame is displayed, a method of closing the glasses 110 and simultaneously excluding the certain frame, or etc.

As described above, the afterimage of the stereoscopic image is effectively reduced to present a clear image, and the left-eye image and the right-eye image are individually controlled by user's selection to give a user convenience.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. A plasma display panel (PDP) display apparatus using glasses comprising a left-eye shutter and a right-eye shutter which alternately open and close in synchronization with a left-eye image and a right-eye image of a stereoscopic image, the PDP display apparatus comprising:
   a video processor which divides and outputs each of frames of the left-eye image and frames of the right-eye image into a plurality of sub-frames of the left-eye image and a plurality of sub-frames of the right-eye image each of which have a different sustaining time when the left-eye image and the right-eye image are input;
   a display unit which displays an image based on the plurality of sub-frames output by the video processor; and
   a controller which prevents recognition of at least one sub-frame of the plurality of sub-frames of the left-eye image and at least one sub-frame of the plurality of sub-frames of the right-eye image based on the sustaining times of the plurality of sub-frames of the left-eye image and the right-eye image.

2. The PDP display apparatus according to claim 1, wherein the controller controls the video processor to exclude at least one sub-frame based on the sustaining times of the plurality of sub-frames.

3. The PDP display apparatus according to claim 1, wherein the controller controls the left-eye shutter and the right-eye shutter of the glasses to be opened and closed so that recognition of the at least one sub-frame is prevented based on the sustaining times of the plurality of sub-frames.

4. The PDP display apparatus according to claim 1, wherein the controller prevents the recognition of the at least one sub-frame of the plurality of sub-frames which has a short sustaining time.

5. The PDP display apparatus according to claim 1, wherein the controller prevents the recognition of a sub-frame of the plurality of sub-frames which has a short sustaining time with respect to one of the left-eye image and the right-eye image.

6. The PDP display apparatus according to claim 1, wherein the controller controls the video processor to make a number of sub-frames in the left-eye image and a number of sub-frames in the right-eye image different from each other, and prevents the recognition of at least one sub-frame in one of the left-eye image or the right-eye image according to a user's selection.

7. The PDP display apparatus according to claim 1, wherein the controller controls the glasses to make a number of sub-frames in the left-eye image and a number of sub-frames in the right-eye image different from each other, and prevents the recognition of at least one sub-frame in one of the left-eye image or the right-eye image, according to a user's selection.

8. A method of driving a plasma display panel (PDP) display apparatus using glasses comprising a left-eye shutter and a right-eye shutter which alternately open and close in synchronization with an inputted left-eye image and an inputted right-eye image of a stereoscopic image, the method comprising:

dividing each of frames of the inputted left-eye images and the inputted right-eye images into a plurality of sub-frames of the left-eye image and a plurality of sub-frames of the right-eye image which have different sustaining times; and preventing recognition of at least one sub-frame of the plurality of sub-frames of the left-eye image and at least one sub-frame of the plurality of sub-frames of the right-eye image based on the sustaining times of the plurality of sub-frames of the left-eye image and the right-eye image.

9. The method according to claim 8, wherein the preventing the recognition of the at least one sub-frame comprises excluding the at least one sub-frame of the plurality of sub-frames.

10. The method according to claim 8, wherein the preventing the recognition of the at least one sub-frame comprises controlling the left-eye shutter and the right-eye shutter of the glasses to be opened and closed so that the recognition of the at least one sub-frame can be prevented.

11. The method according to claim 8, wherein the preventing the recognition of the at least one sub-frame comprises preventing the recognition of a sub-frame of the plurality of sub-frames which has a short sustaining time.

12. The method according to claim 8, wherein the preventing the recognition of the at least one sub-frame comprises preventing the recognition of a sub-frame of the plurality of sub-frames which has a short sustaining time with respect to one of the left-eye image and the right-eye image.

13. The method according to claim 8, wherein the preventing the recognition of the at least one sub-frame comprises making a number of sub-frames of the left-eye image and a number of sub-frames of the right-eye image different from each other, and preventing, the recognition according to a user's selection.

14. The PDP display apparatus according to claim 1, wherein the sub-frames differ according to bit weights of video data, and a sub-frame having a high bit weight is displayed longer than a sub-frame having a low bit weight.

15. A method for reducing afterimage in a stereoscopic image of a display apparatus, the method comprising:

inputting the stereoscopic image; converting the stereoscopic image into a plurality of sub-frame images of a left-eye image and a plurality of sub-frame images of a right-eye image based on a detected synchronous signal, and excluding at least one sub-frame of the plurality of sub-frames of the left-eye image and the plurality of sub-frame images of the fight-eye image, wherein recognition of the at least one excluded sub-frame is prevented based on the sustaining times of the plurality of sub-frames.

16. The method of claim 15, wherein sustaining times of the sub-frame images are different according to bit weights of video data.

17. The method of claim 15, wherein the stereoscopic image comprises frames of a left-eye image and frames of a right-eye image.

18. The method of claim 15, wherein recognition of the at least one excluded sub-frame is based on a sub-frame of the plurality of sub-frames that has a short sustaining time with respect to one of a left-eye image and a right-eye image.

19. The method of claim 15, wherein the recognition of the at least one excluded sub-frame is prevented according to a user selection.

* * * * *